Dec. 31, 1940.  J. W. GREIG  2,226,860

AERIAL NAVIGATION SYSTEM

Filed Sept. 3, 1936  2 Sheets-Sheet 1

INVENTOR
John W. Greig,
BY
ATTORNEYS

Dec. 31, 1940.   J. W. GREIG   2,226,860
AERIAL NAVIGATION SYSTEM
Filed Sept. 3, 1936   2 Sheets-Sheet 2

INVENTOR
John W. Greig,
ATTORNEYS

Patented Dec. 31, 1940

2,226,860

UNITED STATES PATENT OFFICE 2,226,860

AERIAL NAVIGATION SYSTEM

John W. Greig, Dayton, Ohio; Ethel Margaret Greig, executrix of said John W. Greig, deceased Application September 3, 1936, Serial No. 99,313

6 Claims. (Cl. 250—11)

This invention relates to apparatus for navigational purposes and is particularly adapted for use as an aid to the operators of aircraft, water craft and any other craft, vehicle or the like wherein it is desirable that the operator thereof receive an indication of his position with respect to a remote base or field.

The primary object of the present invention is to provide means which functions to indicate the boundaries of a landing field to the operator of an aircraft so as to make is possible to land the aircraft within the boundaries of the landing field, particularly during periods when the landing field is invisible to the operator or during periods of low visibility. More specifically, the main object of the invention is to provide a radio controlled indicator, mounted in the aircraft and controlled by radiant energy emitted from a plurality of known fixed points at the landing field, the radiant energy being received by a compass receiver and transmitted to the indicator to cause deflection of a light beam which impinges on a translucent screen so that the screen becomes illuminated at definite points. The screen is thus illuminated by a number of spots corresponding to the number of points of emission of radiant energy on the landing field, the spatial separation of the spots of light from the center of the indicator being an approximate indication of the angular relation existing between the longitudinal axis through the airplane and the direction of arrival of radiant energy from each of the emissive points, thereby presenting an approximate perspective view of the emissive points.

Another object of the present invention is to provide apparatus for indicating the position of an aircraft with respect to the boundaries of a landing field which also indicates the wind direction, thus indicating to the operator of the aircraft the position of the runways, if such are present, and the proper direction for approaching the particular runway which would be proper under particular weather conditions. To accomplish this end the aircraft is provided with an instrument including a radio compass receiver which receives radiant energy successively from a plurality of known, definite points of emission at the landing field. The radiant energy acts upon a device which, by way of example, might comprise a cathode ray tube wherein a concentrated beam of electrons impinges upon a fluorescent screen, to successively deflect the beam in such manner that it provides a plurality of illuminated spots on the screen, the illuminated spots corresponding in number to the number of points of emission at the landing field and the angular deflections of the beam producing the spots being approximately proportional to the angular relation existing between the longitudinal axis through the airplane and the directions of arrival of radiant energy from each of the emissive points, thereby presenting an approximate perspective view of the emissive points. The means for successively causing the emission of radiant energy at the several points includes a control device which may select and cause the duration of the emissions at any one point to be greater than those at any other of the points, with the result that the illuminated spot on the screen corresponding to the point where the longer emission is taking place will be of greater brilliancy than the other illuminated spots. In operation, the control device is set so that the illuminated spot which is different from the others indicates the wind direction.

In the most general form, the main object of my invention is to indicate the degree of angular parallax existing between any two, or more, fixed points which are emissive of radiant energy, when viewed from a mobile point, thereby providing means for determining the distance of the mobile point from the fixed points.

Another object of my invention is to provide means in apparatus of the character referred to above for operating the plurality of fixed emissive points at a common frequency or wave length, thereby reducing the interference to other services employing the same type of radiant energy.

With the above and other ends in view the invention is more fully disclosed with reference to the accompanying drawings, in which—

Like characters of reference are employed throughout to designate corresponding parts.

Figure 2:
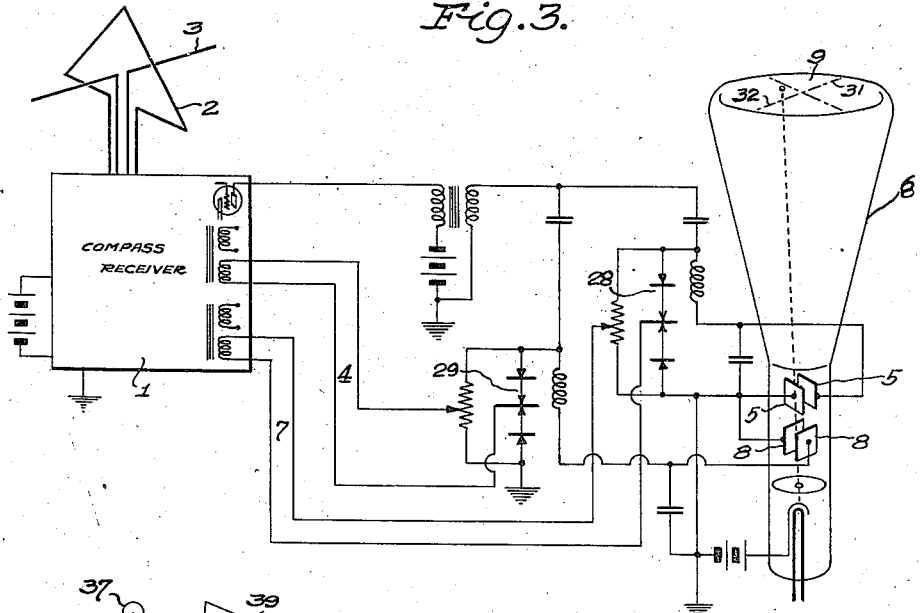
Fig. 2 is a diagram of the radio receiver.

Figure 2 illustrates the receiving apparatus which includes a radio compass receiver 1 of the three dimensional type shown in my prior Patent 2,003,933, issued June 4, 1935. A loop antenna 2, and a longitudinal and vertical antenna 3, are connected to the input of the radio compass receiver. Such radio compasses are well known in the art and ordinarily have two output channels. One channel functions to indicate by means of a phase polarity indicator the phase polarity and output of a transverse antenna relative to a vertical antenna, and the other channel functions in similar manner to indicate the output of a longitudinal antenna relative to a vertical antenna. The meter which is ordinarily associated with the output channel of the transverse antenna is known as the rudder control meter inasmuch as it indicates deviations of the aircraft to the right or left from the direction of arrival of the radio waves, and the meter associated with the longitudinal antenna is known as the elevator meter inasmuch as it indicates deviations of the aircraft up or down from the direction of arrival of the radio waves. In the present case, both the elevator and rudder meters are dispensed with. The output channel 4 of the radio compass receiver, which was heretofore connected to the left-right or horizontal indicator, is, in the present case, connected to the deflector plates 8 in a cathode ray tube 6. The output channel 7, associated with the longitudinal antenna and formerly connected to an up-down meter or indicator is here connected to the beam deflection plates 5. It becomes apparent, therefore, that the output channels act upon different sets of deflection plates in the cathode ray tube and the connections are such that the beam which impinges on the fluorescent screen to form a small spot of light thereon is controlled by the voltages impressed through output channels 4 and 7.

In order that the manner of deflection of the beam in the cathode ray tube may be better understood attention is called to the salient features disclosed in my prior Patent 2,003,933 and which are now known to the art of radio direction finding. The radio compass described by the aforementioned patent employs a three channel input and a two channel output. One input channel connects to a vertical reference antenna or the equivalent. A second input channel connects to a transverse antenna, having the properties of a loop. A third input channel connects to a longitudinal antenna. Comparison of the phase polarity and magnitude of the output of the transverse antenna with the output of the vertical reference antenna, is a well known method of determining the direction of arrival of vertically polarized radiant energy in the horizontal plane. Likewise the direction of arrival may be determined in the vertical plane by comparison of the output of the longitudinal antenna with the output of the vertical antenna.

As is explained in detail in my prior Patent No. 2,003,933, the electrical current in one output channel of the radio compass will be a function of the direction of arrival of the radiant energy in a horizontal plane, and the electrical current in the other output channel will be a function of the direction of arrival of the radiant energy in the vertical plane. In the present invention the output channel responsive to the horizontal component is connected through a known form of phase comparison rectifier to the horizontal deflection plates of a cathode ray indicator and produces a right or left deflection of the electron beam according as to whether the direction of arrival of the radiant energy is to the right or left of the longitudinal axis of the aircraft. Likewise, the output channel which is responsive to the vertical component is similarly connected to the vertical deflection plates of the cathode ray indicator and produces an up or down deflection of the electron beam according as to whether the direction of arrival of the radiant energy is from above or below the longitudinal axis of the aircraft. It is also well known in the art that suitable automatic volume controls may be employed with the receiver to make the extent of the deflection a linear function of the angular deviation of the direction of arrival from the longitudinal axis of the aircraft. Therefore, the combination of both output channels on the cathode ray tube will result in a deflection of the electron beam both horizontally and vertically whereby the illuminated spots produced by such deflection will give an approximate measure of the angle of arrival of the radiant energy as measured in three dimensional space.

The substitution of a conventional cathode ray tube for the indicators described in Patent No. 2,003,933 is considered as obvious to those versed in the art and sufficient circuit information is given in the diagram of Fig. 2 to disclose an operative embodiment of the invention.

Figure 1:
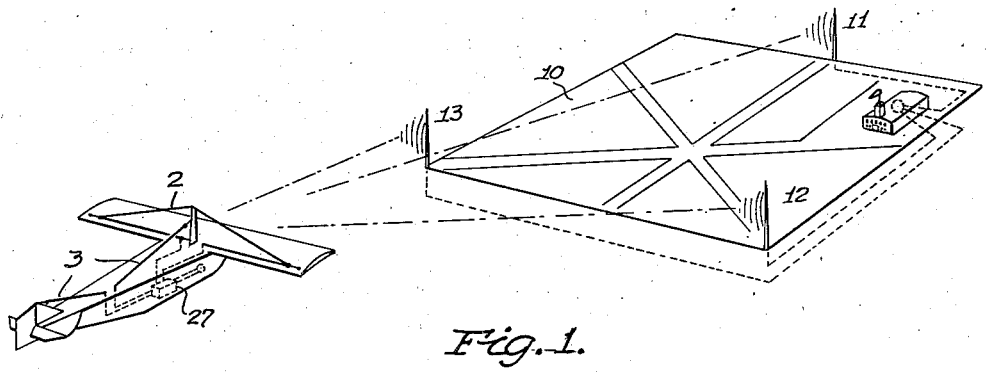
Figure 1 is a perspective of a landing field.
Figure 3:
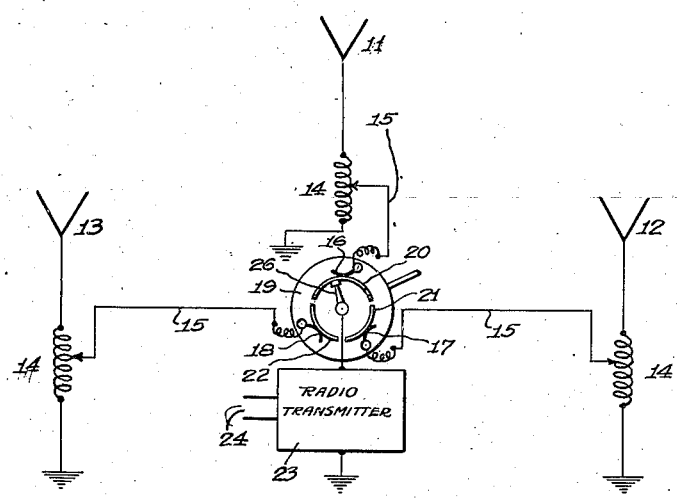
Fig. 3 is a diagram of the radiant energy emitting apparatus.

With reference particularly to Fig. 1, the numeral 10 designates a landing field with a runway defined by three antennas designated respectively 11, 12 and 13. The transmitting system, shown in Fig. 3, includes the three antennas 11, 12 and 13, which are located at the boundaries of the field as shown in Fig. 1, and each antenna has a tuning circuit 14 connected by transmission lines 15 to brushes 16, 17 and 18 respectively. A rotatable contact support 19 has three contacts 20, 21 and 22 thereon and is adapted to be positioned so that each brush individually engages one contact. By manually rotating the support 19 the contacts may be shifted so that the different contacts may be moved into engagement with different brushes. As shown, the contacts 20, 21 and 22 are of arcuate form with the adjacent ends slightly spaced apart, and the contact 20 is of greater length than either of the contacts 21 and 22. A radio transmitter 23, energized from a suitable power source through transmission lines 24, supplies radio frequency current to a distributor arm 26 which constantly revolves about a fixed axis so that it successively engages the contacts 20, 21 and 22.

The radio energy is distributed to the contacts 20, 21 and 22 successively and from the contacts through brushes 16, 17 and 18 and their associated transmission lines 15 to the antennas 11, 12 and 13. Radio energy is therefore emitted from the antennas 11, 12 and 13 successively for intervals corresponding to the duration of engagement between the distributor arm 26 and their respective contacts. Inasmuch as the contact 20 is of greater length than the other two the duration of the emission of radio energy from the antenna 11 will be greater than the duration of the emission from the antennas 12 and 13, because the antenna 11 is shown as being in electrical connection with the contact 20. However, by shifting the support 19 the contact 20 may be selectively placed in engagement with either of the brushes 21 or 22, in which case the antenna connected with the contact 20 would have an emission period greater than the other two.

Figure 4:
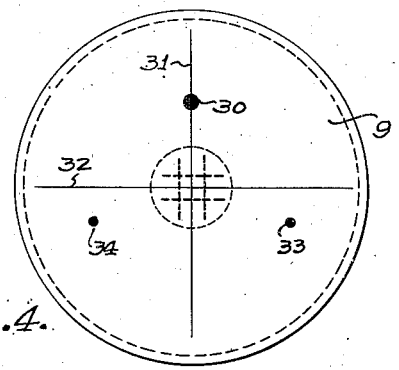
Figs. 4, 5 and 6 are views of the indicating instrument illustrating different indicating conditions.

In Fig. 1 there is illustrated an airplane 27 equipped with a transverse antenna 2 and a longitudinal antenna 3, described above in the descriptive matter pertaining to the radio compass receiver. The airplane is shown as approaching the landing field 10 and heading in the direction of the antenna 11. Inasmuch as the distributor arm 26 is in engagement with the contact 20, radio energy is being emitted from the antenna 11, and this energy is received in the radio receiver in the airplane and produces an output from the compass receiver 1 in which the directional information is contained in the amplitudes and phase polarities of two audio frequencies. These audio frequencies are converted into unilateral voltages by the action of the rectifiers 28 and 29, operating on the horizontal and vertical directional channels respectively, as is explained in minute detail in Patent No. 2,003,933, issued to me June 4, 1935. The ouput of the vertical channel, when applied to the plates of the cathode ray tube, deflects the electron beam up or down according to the direction of arrival of the radiant energy above or below the longitudinal axis of the airplane. In like manner the output from the horizontal channel is applied to the plates controlling the horizontal deflection of the beam, and the resultant deflection of the beam will produce an illuminated spot on the fluorescent screen 9. If the airplane is in its proper gliding path with the nose pointing at the center of the field and heading toward the antenna 11, the spot 30 thus produced will lie on the vertical center line 31 of the screen 9 and above the horizontal center line 32, substantially as shown in Fig. 4.

As the distributor arm 26 continues to move, say in a clockwise direction, it engages the contact 21 and an emission of radiant energy takes place from the antenna 12 which is associated therewith. The output of the radio compass receiver is changed, due to the fact that the angular relationship of the airplane is different with respect to the antenna 12 than with respect to the antenna 11. The output with respect to the antenna 12 effects the plates of the cathode ray tube to deflect the beam therein so that the screen 9 becomes illuminated at a different spot 33 located to the right of the vertical center line 31 and slightly below the horizontal center line 32. As the distributor arm 26 next engages the contact 22 an emission of radiant energy takes place at the antenna 13 and the output of the radio compass receiver is again changed from both of the outputs above described, and this third output effects the deflecting plates and causes the beam to illuminate the screen 9 at a third spot 34. This third spot is located to the left of the vertical center line 31 and slightly below the horizontal center line 32. The positions of the three spots 30, 33 and 34 on the screen 9 will, therefore, have the same angular relationship as the angular relationship of the antennas 11, 12 and 13 if they could be viewed from the point of reception of the radio waves.

It is preferred that the distributor arm 26, which causes a succession of pulses to be emitted from the antennas 11, 12 and 13, be moved at a speed whereby the persistency of vision of the eye may be utilized in producing the apparent simultaneous appearance of three spots on the screen. Certain known forms of cathode ray tubes may be used wherein the fluorescent screen is of retentive nature in which the image persists after the beam has been moved.

The location of the spots 30, 33 and 34 on the screen 9 in the positions above described indicate to the operator a picture of the field as viewed in perspective from the point of reception.

Figure 5:
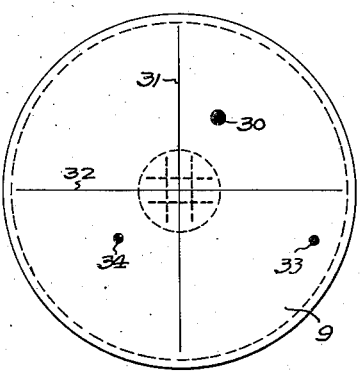
Figure 6:
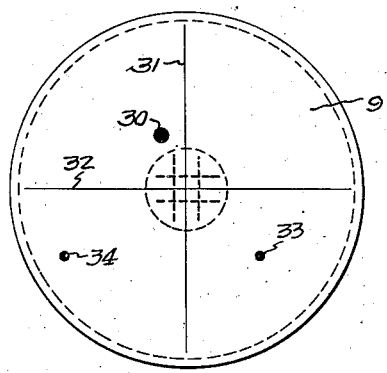

Due to the fact that the emissions of radiant energy from the antenna 11 are of greater duration than those from the other antennas the spot 30 will be more prominent than the other two spots. The prominent spot 30 indicates to the operator of the airplane the farther boundary of the field and that he is heading into the wind, while the two spots 33 and 34 indicate the right and left boundaries of the landing field and also the nearer boundary. When the plane approaches the field in the proper attitude for landing, the two spots 33 and 34 will be equally spaced on opposite sides of the vertical center line 31 and spaced slightly beneath the horizontal center line 32, in the same horizontal plane. The distance to the field is indicated approximately by the separation of the spots, and the altitude may be approximately estimated by the vertical separation between the spot 30 and the other two spots 33 and 34. If the airplane deviates from the position shown the spots will shift from the lines 31 and 32, that is, if the airplane turns to the left the spots will shift to the right of the line 31 as illustrated in Fig. 5, and if the airplane deviates to the right and upwardly at the same time the spots will shift to the left of the line 31 and downwardly with respect to the line 32.

In the event the wind direction changes and the airplane should be landed from another direction the contact support 19 is rotated so that the antenna in the direction nearest to that from which the wind is blowing will have the longer emission. In that case, the airplane will land from a different direction, but the indication will appear to be the same.

Figure 7:
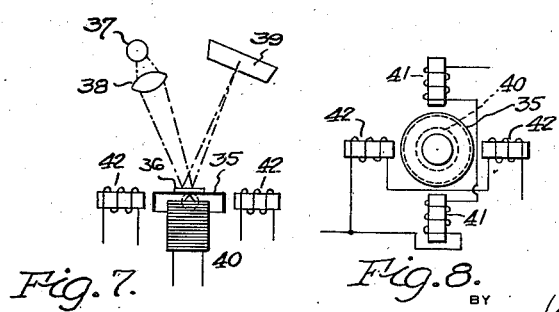
Figs. 7 and 8 are diagrams of a modified form of indicator apparatus.
Figure 8:
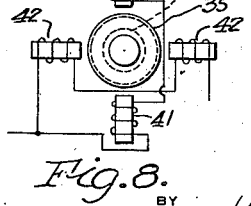

In Figs. 7 and 8 there is illustrated an alternative form of indicator which may be used, if desired, instead of the cathode ray tube above described, the connection with the radio compass receiver being practically the same as with a cathode ray tube with the exception that it does not require the use of rectifiers. This indicator operates on a dynamometer principle and comprises a short circuiting ring 35 upon which is mounted a mirror 36 which deflects a light beam from a source 37 and the condensing lens 38 to the translucent screen 39. The ring 35 is mounted upon an axial pivot and axially disposed with respect to the ring 35 is a coil 40. Two pairs of coils 41 and 42 are provided, the coils extending radially around the ring 35 and being spaced ninety degrees apart with one coil of each set diametrically opposite the other coil of its respective set. Both the vertical and horizontal output channels of the radio compass receiver, such as the output channels 4 and 7 described with reference to Fig. 2, are connected to the field coil 40, which induces these frequencies in the short circuiting ring 36. The frequencies from the horizontal and vertical modulator oscillators are applied to the coils 41 and 42 respectively. The reaction between the field from the coils 40 and 41 will rock the ring 35 on its pivot to produce horizontal movement of the light beam with respect to the screen 39. Likewise, the reaction between the coils 42 and the current induced in the ring 35 will rock the ring to give a vertical deflection of the light beam. The combination of these two forces will locate the spot produced by the impinging of the light beam on the screen 39 to indicate on the screen the direction of arrival of the radiant energy. By emitting the radiant energy from a plurality of spaced points, as above described, a separate spot will be produced on the screen for each point of emission, and the several spots on the screen will be angularly related the same as the angular relationship of the points of emission if such points of emission could be viewed from the point of reception.

The invention has been illustrated and described with reference to three landing field antennas from which radiant energy is successively emitted. It will be understood, however, that the particular member shown is by way of example only, and any other number deemed desirable may be provided by increasing or decreasing the number of contacts in the distributor mechanism and regulating the speed of movement of the rotary distributor arm to provide for the desired duration of the emissions of radiant energy. Landing fields equipped for commercial or transport airplane traffic quite commonly used the three direction runway plan and the illustration here has been made to conform with such a plan. However, if a plan is desired wherein a greater number of runway directions are desired the invention may be made to conform with any such plan by increasing the number of points of emission accordingly.

In particular, it is contemplated that the principle of successive operation of several emitters of radiant energy might be applied to acoustic radiations, either in air, or in water. The use of extremely high frequency radio transmitters is also contemplated, in which the radiations may be closely related to radiant heat or infra-red.

The three dimensional radio compass receiver has been described only as the preferred embodiment of the receiving equipment, and other forms of radio compass receivers capable of indicating the direction of arrival of radiant energy might be equally well employed. For example, a simpler form of the invention may be provided in which the parallax information is given only in the horizontal plane, and in which the indication is obtained upon a motor rather than a screen. Still other forms of receivers may be employed when the present invention is used with acoustic, sub-aqueous, or heat radiations.

While the system has been described above as being operated from a single transmitter successively supplying energy to the several emitters, it is within the scope of the invention to associate a separate transmitter with each emitter and to control the inputs to the transmitters to produce a successive energization thereof; or otherwise control the transmitters by means known to the art.

Although specific embodiments of the invention have been illustrated and described it will be understood that various changes may be made within the scope of the appended claims without departing from the spirit of the invention, and such changes are contemplated.

What I claim is:

1. An apparatus for creating a spatial pattern of radiant energy at a landing field to produce at an approaching airplane a wave front of radiant energy by which to guide the airplane to the field in accordance with the pattern, said apparatus comprising, a radio transmitter, a plurality of radio antennae spaced apart with respect to each other and physically defining the pattern, a distributor connected to said transmitter and having a plurality of unitarily movable conductors equal in number to the number of said antennae, means for successively and individually inter-connecting the latter with said transmitter through said conductors to energize each of said antennae exclusively of the others during the interval of time said antenna is connected with said transmitter, means associated with one of said conductors for effecting a connection between its respective antenna and said transmitter of different duration than those of the connections between the other antennae and said transmitter whereby to establish in the wave front at the approaching airplane a means for differentiating said one antenna from said other antennae in accordance with pre-arranged plans regarding weather conditions at the field, and means for selectively subjecting another of said antennae in lieu of said one antenna to the function of said one conductor to meet with changing weather conditions at the field.

2. In an aerial navigation system for directing an airplane to a landing place, at least three antennae spaced apart from each other and disposed at the boundaries of the landing place, means for repeatedly sending out electromagnetic signals of the same frequency in succession from said antennae, means including fixed antennae in the airplane for receiving the signals thus successively sent out from the three antennae, and an electromagnetic indicator connected to said receiving means, said indicator having a screen, means for projecting a luminous beam on said screen, and means responsive to the successively received signals for successively moving said beam from point to point on said screen, whereby to reproduce on said screen a plurality of luminous simulations of the locations of said antennae.

3. In an aerial navigation system for directing an airplane to a landing place, at least three antennae spaced apart from each other and disposed at the boundaries of the landing place, means for repeatedly sending out electromagnetic signals of the same frequency in succession from said antennae, means for selectively varying the duration of the signals sent out from one of said antennae relatively to the duration of the signals sent out from the other antennae whereby to indicate the wind direction relatively to the location of the antenna sending out the signals of different duration, means including fixed antennae in the airplane for receiving the signals thus successively sent out from the three antennae, and an electromagnetic indicator connected to said receiving means, said indicator having a screen, means for projecting a luminous beam on said screen, and means responsive to the successively received signals for successively moving said beam from point to point on said screen, whereby to reproduce on said screen a plurality of luminous simulations of the locations of said antennae with a more prominent simulation indicating the antenna denoting the wind direction.

4. In an aerial navigation system for directing an airplane to a landing place, at least three antennae spaced apart from each other and disposed at the boundaries of the landing place, means for repeatedly sending out electromagnetic signals of the same frequency in succession from said antennae, means for selectively varying the duration of the signals sent out from one of said antennae relatively to the duration of the signals sent out from the other antennae whereby to indicate the wind direction relatively to the location of the antenna sending out the signals of different duration, and means for selectively transferring the transmission of said different-duration signals from said one antenna to another antenna in accordance with a shifting in the wind direction.

5. In an aerial navigation system for directing an airplane to a landing place, at least three antennae spaced apart from each other and disposed at the boundaries of the landing place, means for repeatedly sending out electromagnetic signals of the same frequency in succession from said antennae, means for selectively varying the duration of the signals sent out from one of said antennae relatively to the duration of the signals sent out from the other antennae whereby to indicate the wind direction relatively to the location of the antenna sending out the signals of different duration, means for selectively transferring the transmission of said different-duration signals from said one antenna to another antenna in accordance with a shifting in the wind direction, means in the airplane for receiving the signals thus successively sent out from the three antennae, and an electromagnetic indicator connected to said receiving means, said indicator having a screen, means for projecting a luminous beam on said screen, and means responsive to the successively received signals for successively moving said beam from point to point on said screen, whereby to reproduce on said screen a plurality of luminous simulations of the locations of said antennae with a more prominent simulation indicating the antenna denoting the wind direction.

6. In an aerial navigation system for directing an airplane to a landing place, at least three antennae spaced apart from each other and disposed at the boundaries of the landing place, means for repeatedly sending out electromagnetic signals of the same frequency in succession from said antennae, means including fixed antennae in the airplane for receiving the signals thus successively sent out from the three antennae, and an electromagnetic indicator connected to said receiving means, said indicator having a screen, means for projecting a luminous beam on said screen, means responsive to the successively received signals for successively moving said beam from point to point on said screen, whereby to reproduce on said screen a plurality of luminous simulations of the locations of said antennae, and means for indicating on said screen the direction of flight of said airplane relatively to said luminous simulations of the locations of said transmitting antennae, whereby to reproduce on said screen a three-dimensional perspective representation of the locations of the landing place antennae in relationship to the airplane flying direction as it approaches the landing place.

JOHN W. GREIG.